United States Patent [19]

Reynolds

[11] Patent Number: 4,620,362

[45] Date of Patent: Nov. 4, 1986

[54] CHANGEABLE TOOLING SYSTEM FOR ROBOT END-EFFECTOR

[75] Inventor: Gregory E. Reynolds, King County, Wash.

[73] Assignee: The Boeing Company, Seattle, Wash.

[21] Appl. No.: 623,777

[22] Filed: Jun. 22, 1984

[51] Int. Cl.[4] .......................................... B23Q 3/155
[52] U.S. Cl. .................. 29/568; 279/1 TS; 294/907; 414/730; 901/30; 901/34
[58] Field of Search ............... 29/568, 26 A; 408/31, 408/42, 43, 11; 279/1 TS; 901/30, 34, 35, 41, 43; 414/730; 294/106, 907

[56] References Cited

U.S. PATENT DOCUMENTS

| | | | |
|---|---|---|---|
| 3,143,900 | 8/1964 | Oeckl et al. | 29/568 |
| 3,229,656 | 1/1966 | Bodey | 901/50 |
| 3,354,760 | 11/1967 | Barragan | 29/568 |
| 3,559,257 | 2/1971 | Lemelson | 901/41 |
| 4,132,318 | 1/1979 | Wang et al. | 901/12 |
| 4,332,066 | 6/1982 | Hailey et al. | 408/237 |
| 4,370,091 | 1/1983 | Gagliardi | 414/4 |

Primary Examiner—Gil Weidenfeld
Assistant Examiner—Daniel W. Howell
Attorney, Agent, or Firm—Hughes & Cassidy

[57] ABSTRACT

A robotic tool changing system which is compatible with manipulators (20) of the type having a pair of opposable vise-like end-effector "fingers" (22,24) formed on an end-effector (21) is disclosed which may be used to grip and manipulate a wide range of different tools (42,44,45) and wherein the end-effector (21) includes: (i) alignment ports (29,30,34,35) formed on the gripping fingers (22,24) for reception of alignment pins (29',30',34',35') formed on the tools (42,44,45); (ii) a resistor (R1) embedded within each tool (42,44,45) which is uniquely representative of that tool; (iii) a tool comparator circuit (50) having at least one reference resistor (R2) for enabling identification of the particular tool gripped by the end-effector (21) and for generating a control output signal capable of selecting, defining and enabling and requisite utility(ies) and utility control line(s) required for proper operation of the gripped tool; (iv) electrical contact means (31,32) formed in at least one finger (22) for cooperable engagement with electrical connector pins (31',32') formed on the tools (42,44,45); and (v), fluid connector ports (36,38) formed in at least one finger (24) for enabling fluid transfer to the tool (42,44,45) via fluid connecting ports (36',38') formed in the tool; so as to enable sensing of the resistance value of the resistor (R1) and delivery of any required electrical utility(ies) and/or fluid utility(ies) via suitable utility control line(s) (33,39,40).

17 Claims, 10 Drawing Figures

CHANGEABLE TOOLING SYSTEM FOR ROBOT END-EFFECTOR

BACKGROUND OF THE INVENTION

1. Technical Field

The present invention relates generally to robotic tool changing systems which are compatible with one of the most conventional type of robot end-effectors or "hands" used in industry at the present time; and, more particularly, to a simple, highly flexible, yet effective and versatile changeable tooling system for robotic end-effectors which permits the opposable, generally parallel, vise-like "fingers" of an otherwise conventional robotic end-effector—i.e., "fingers" which are capable of being moved towards one another in a closing operation to grasp, retain and manipulate the particular tool to be employed, and providing all motive power and/or utility connections (electrical, pneumatic, hydraulic and/or material dispensing such as adhesive or the like) for such tool; or, to move away from one another in an opening operation to release the particular tool previously used prior to grasping yet another different type of tool—to: (i) acquire; (ii) align and grasp; (iii) identify the requisite motive power and/or utility connections required to operate the particular acquired tool and to render such specifically identified power and/or utility connections operative; and (iv), to manipulate such tool through its normal operating cycle, all without the need for human intervention. Thus, the exemplary changeable tooling system for robotic end-effectors employing features of the invention permits the employment of tool alignment mechanisms at the tool/"finger" interface and a plurality of generic electrical and/or fluid interconnections at such interface, with all tool identification circuitry and electrical and fluid utility lines required to identify and operate a wide range of different types of tools being permanently installed in, and routed internally through, the robot arm and/or end-effector so as to permit any given tool—whether it be electrically powered, fluid powered (pneumatic and/or hydraulic), or coupled to two or more different types of motive power and/or utility lines—to be acquired, identified, coupled to the applicable utility line(s) uniquely required for that tool, and operably manipulated, all without the need to make any change, modification or adjustment to the robot end-effector and/or without the need to replace the end-effector at the "wrist level" with a different end-effector uniquely designed for coupling to the next specific tool to be employed.

2. Background Art

With the rapidly increasing trend towards industrial mechanization and automation, a wide range of different types of robotic tool manipulators have been developed, particularly during the last few decades. One of the most common types of robotic tool manipulating devices, and the one which has found relatively widespread commercial acceptance in a wide range of different industrial applications, is a robotic tool manipulator of the type having an end-effector or "hand" employing a pair of opposable, generally parallel, vise-like, grasping "fingers" which are capable of being moved towards one another to grasp and retain a tool or other object therebetween for operable manipulation thereof; and, upon completion of the operational cycle for that particular tool or object, to be moved away from one another so as to release the tool or object. In general, however, each different tool to be employed will have its own unique set of operating requirements such, for example, as interconnectability to one or more electrical utility lines for providing motive power, fluid utility lines for powering the tool and/or for controlling metered discharge of materials to be discharged and employed by the tool, etc.

As a consequence of the varying and specific utility requirements for each different tool employed in a particular operational routine to be carried out on a given workpiece and/or on a plurality of successively presented workpieces, it has been found that robotic tool manipulators of the type most commonly used today—e.g., robots having opposable, vise-like, finger-type end-effectors—generally require that the specific end-effector be custom designed for compatibility with only one specific tool or, perhaps, a few similarly designed tools. Thus, when faced with an operational task requiring the use of a significantly different type of tool and/or requiring coupling to a different utility line or combination of utility lines, the user must resort to either a different robotic tool manipulator or, alternatively, the specially designed end-effector or "hand" of the manipulator must be removed and replaced with a different end-effector specifically designed for compatibility with the next type of tool to be employed. Generally, this requires human intervention and a relatively complex manual operation where one end-effector is unbolted and disconnected from the robot arm at the "wrist level" and replaced with a different end-effector specially designed for coupling with the new tool to be employed. Not only is such an operation time-consuming and labor-intensive but, moreover, it can require significant capital investment in terms of stocking a plurality of specially designed end-effectors each of which has only a limited range of use.

In addition, where the robot arm is required to accommodate a wide range of different types of end-effectors, the manipulator generally requires the provision of a plurality of electrical and/or fluid utility lines that can be selectively defined and controlled, and externally coupled to the various tools employed, often resulting in systems wherein the utility lines impinge upon the tool work space with the consequent risk that such lines will become entangled with the workpiece, fixture and/or with the robot arm, end-effector or tool carried thereby. Moreover, when employing special purpose custom designed end-effectors, it has been found that such devices, while highly effective for use with the particular tool for which they are designed, often are incapable of grasping and manipulating other tools or objects. And, of course, when the robots require a "wrist level" tool change, the robot will not, at least in most instances, have a useful end-effector without a special purpose tool installed therein.

One prior patent of general interest is U.S. Pat. No. 4,310,958—Balaud et al. Thus, this patent discloses an exemplary production line automatic machine or robot having the ability to be used with a plurality of successive tools. To accomplish this, the robot employ rather complex special purpose bearing plates adapted to be engaged with complementary mating bearing plates on the particular tools to be subsequently employed. Rather than an end-effector employing opposable "fingers", the patentees disclose the use of coupling arrangements including pivotable flanges, axially movable rods, and rotating screws. No provision is made for tool "identification" and/or selection of an appropriate one or more of a plurality of power and/or utility lines.

In U.S. Pat. No. 4,046,263—Cwycyshyn et al, the patentees disclose a multi-axis robot for selectively receiving and holding one of at least two different work tools. Again, the tool changing system is suitable only for use with tools having custom designed mating couplings; and, no provision is made for tool identification and redefinition of a plurality of interconnectible power and/or utility lines.

In U.S. Pat. No. 4,165,116—Baudoin et al, the patentees describe grasping apparatus for the tongs of a remote manipulator which enables the manipulator to handle objects which are otherwise difficult to handle with conventional robotic grippers. To this end, the apparatus includes, in essence, a glove into which the robotic gripper tongs are inserted so as to provide positive registration between the gripper tongs and special purpose objects.

Other patents of miscellaneous interest include: U.S. Pat. Nos. 3,551,005—Brun and 3,635,184—Liautaud, both of which disclose underwater connectors; U.S. Pat. Nos. 3,917,335—Jones and 4,360,230—Wood et al, which disclose gripper mechanisms for handling and extracting nuclear fuel rods; and, U.S. Pat. Nos. 3,171,327—Williamson, 3,254,567—Daugherty, and 4,057,881—Stephens, which disclose various types of tool gripper mechanisms suitable for use with machine tools such as turret-type lathes and the like. U.S. Pat. Nos. 3,963,271—Sugino et al and 4,132,318—Wang et al, and European Pat. Application No. 81303347.9 published on Mar. 2, 1982, under Publication No. 0045174, assigned to the applicant Fujitsu Fanuc Limited, are of general interest for their disclosures of opposable finger-type end-effectors. Several of the foregoing published documents describe, and are representative of similar descriptions of, such conventional robotic elements as alignment pins, electrical contacts, locking mechanisms, sealing mechanisms, and the like—viz., features which, of and by themselves, are common to robotic tool interface designs.

But, the foregoing patents and/or publications fail to describe or suggest a simple, effective, highly versatile, generic robotic end-effector of the vise-like opposable finger type capable of handling virtually any type of object irrespective of the object's compatibility or lack of compatibility with alignment, motive power and/or utility interconnections, as well as a wide range of different special purpose tools each having their own unique utility requirements and wherein the tool changing system includes provision for identifying the specific tool grasped and automatically selecting, defining, and rendering operative, only that particular utility line or those particular utility lines required for proper operation of that specific tool; and, then, only when the tool is properly aligned and grasped by the end-effector fingers.

SUMMARY OF THE INVENTION

A simple, highly effective and versatile robotic tool changing system which is compatible with manipulators of the type having a pair of opposable vise-like end-effector "fingers", is disclosed which may be used to grip and manipulate a wide range of different tools, workpieces and/or other objects irrespective of whether the particular tool or object gripped by the end-effector fingers is or is not compatible with the end-effector per se; and, wherein the tool manipulator's or robot's arm and/or end-effector includes: (i) an alignment mechanism for effecting proper registration of the various tools with the end-effector fingers, but which does not interfere with gripping of noncompatible objects by the end-effector; (ii) an identification mechanism for identifying the specific tool grasped by the end-effector and rendering operative and defining only the applicable utility line(s)—whether electrical, fluid, mechanical or a combination of two or more such utility lines—which is (are) required for proper operation of that specific tool, and then only when the tool is properly aligned, gripped and ready for use; and (iii), all required motive power and/or utility lines which might be required for any given tool, and wherein the necessary interconnection couplings for such lines are generically located in the opposed internal faces of the end-effector "fingers" or suitable adaptive pads mounted thereon for engagement with the applicable one or ones of similar generically located interconnection couplings in opposed faces of the tool so as to eliminate the need for external motive power and/or utility lines adapted to be externally coupled to the tool and which might otherwise impinge upon the tool work space and create the risk of entanglement during operation. More specifically, the changeable tooling system for robotic end-effectors of the present invention includes: (i) alignment ports on the tool or object engaging faces of the end-effector fingers suitable for receipt of alignment pins formed on the tools themselves; (ii) generically located electrical comparator terminals positioned to be electrically coupled to the terminals of an identification resistor or the like mounted within the tool and which, by its preset resistance value, uniquely identifies the tool by comparison of the resistance value of the tool's identification circuit with a preset or settable resistance value within the robot's controller, such that when the particular tool is properly aligned, gripped and identified, the particular one or ones of a plurality of motive power and/or utility lines required for proper operation of that tool are rendered operative and defined; and (iii), a plurality of generically located interconnection coupling devices—both electrical and fluid—are disposed internally of the end-effector fingers and positioned for registration and interconnection with the specific motive power and/or utility lines generically located in the particular tool so as to permit operation thereof.

More specifically, it is a general aim of the present invention to provide an end-effector/tool interface between two opposite faces of any given tool and the internal faces of opposable vise-like fingers on a robotic end-effector which provide no impediment to normal gripping action, thus enabling the end-effector to pick up and manipulate objects which lack mating interface connections, while at the same time assuring that any and all electrical, fluid and/or mechanical interconnection control lines necessary to identify the tool and operate the same are automatically coupled and, where applicable, rendered operative by the simple expedient of having the robotic end-effector properly grip the tool itself, all without the need for human intervention and/or separate locking, connecting and/or sealing mechanisms.

In one of its principal aspects, it is an object of the invention to provide a robotic tool manipulator and tool changing system, wherein each tool has its own unique identifying characteristics which are automatically sensed by the robotic controller when the tool is properly gripped by the end-effector so as to identify the tool gripped and enable the proper power and/or utility lines for the robotic manipulator.

DESCRIPTION OF THE DRAWINGS

These and other objects and advantages of the present invention will become more readily apparent upon reading the following detailed description and upon reference to the attached drawings, in which.

While the invention is susceptible of various modifications and alternative forms, specific embodiments thereof have been shown by way of example in the drawings and will herein be described in detail. It should be understood, however, that it is not intended to limit the invention to the particular forms disclosed; but, on the contrary, the intention is to cover all modifications, equivalents and alternatives falling within the spirit and scope of the invention as expressed in the appended claims.

DETAILED DESCRIPTION

Turning now to the drawings, there has been illustrated in FIGS. 1 and 2 a fragmentary portion of a robotic tool manipulator, generally indicated at 20, of the type employing a generally conventional (except for the specific features of the present invention described hereinbelow) robot "hand" or end-effector 21 having a pair of opposable, vise-like, gripper fingers 22,24 adapted to be moved towards one another when gripping tools and or other objects (not shown in FIGS. 1 and 2); and, thereafter, away from one another when releasing such tools and/or other objects. In the exemplary system shown in FIGS. 1 and 2, only that portion of the robot end-effector 21 located below the "wrist level" has been depicted; and, it will be understood by those skilled in the art as the ensuing description proceeds that the particular details of the robot arm, torso or frame, and controller circuit therefor may be completely conventional and, since they form no part of the present invention, they need not, and will not, be described herein in detail.

Similarly, the particular mechanical drive arrangement for moving the end-effector "fingers" or gripping elements 22,24 towards and away from one another is completely conventional, forms no part of the present invention and, therefore, will not be described herein in detail. Suffice it to say that the end-effector 21 employs pairs of bifurcated support links 25,26 which are respectively coupled to the fingers 22,24 by suitable pivot pins 28 or the like and which are actuated by any suitable and completely conventional actuating linkage and mechanism (not shown) disposed internally of the end-effector 21 and actuated from the robot controller (not shown). As will be appreciated, however, the actuating linkage and mechanism for the "fingers" 22,24 are such that the inwardly presented opposed faces 22',24' of the "fingers" 22,24 remain in parallel facing relation to one another at all operative positions—i.e., from a position where the "fingers" 22,24 are fully closed (not shown) with the inwardly presented opposed faces 22',24' in essentially abutting face-to-face relation (viz., a position precluding the end-effector from gripping any objects other than paper-thin sheets) to relatively widely spaced apart positions such as shown in FIGS. 1 and 2 capable of receiving and gripping tools or other objects therebetween.

In carrying out the present invention, the inwardly presented face 22' of gripper element 22 is provided with a pair of vertically spaced alignment ports or openings 29,30, adapted to receive alignment pins formed on each tool to be used; and, two (2) vertically spaced sets of recessed electrical contacts or terminals, generally indicated at 31,32, which may be electrically "activated" either individually or in preselected groups, dependent upon the operational requirements for the particular tool being employed. As will hereinafter be described in greater detail, any two (2) of the recessed electrical contacts in the vertically spaced sets 31,32 are preferably dedicated for completion of a tool identification circuit which, in the exemplary form of the invention comprises an electrical comparator circuit used to identify the resistance value of an identifying resistor embedded within each tool (not shown in FIG. 1) for purposes of uniquely identifying the particular tool gripped by the end-effector 21. All recessed electrical contacts or terminals in the two vertically spaced sets 31,32 are coupled to the robot controller (not shown) via any suitable multiconductor shielded cable 33, or the like.

Figure 2:
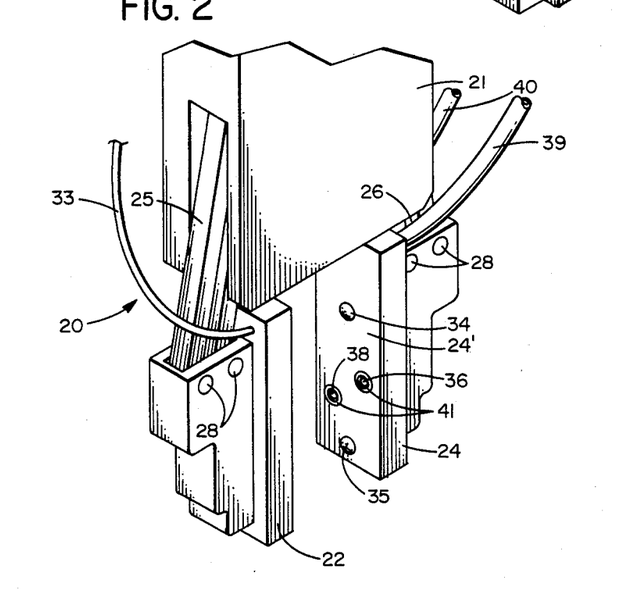
FIG. 2 is a fragmentary perspective view similar to FIG. 1, but here taken from a slightly different angle and depicting, in particular, the operative face of the other of the end-effector "fingers"

In like fashion, and as best observed upon reference to FIG. 2, the inwardly presented tool engaging face 24' of "finger" 24 is also provided with a similar pair of vertically spaced alignment ports or openings 34,35, adapted to receive alignment pins formed on each tool to be used. Additionally, a pair of recessed fluid connector ports 36,38 are formed in the end-effector "finger" 24 and are respectively coupled via internal fluid conductors (not shown in FIG. 2) to respective ones of a pair of fluid supply lines 39,40. Thus, either or both of the lines 39,40 may be rendered operative (pneumatically or hydraulically) for purposes of establishing the required utility control lines for the particular tool to be employed—for example, to power a fluid powered tool or to cause metered or controlled discharge of discrete and/or measured quantities of some particular material to be dispensed by the tool such as a solvent, adhesive or the like. Preferably, the inwardly presented face 24' of end-effector finger 24 is recessed to accommodate a pair of deformable "O"-ring seals 41 surrounding the fluid connector ports 36,38 so as to insure that when a tool is tightly grasped between the fingers 22,24, a leak-tight connection is established at the interface between the tool (not shown in FIGS. 1 and 2) and the tool engaging face 24' of finger 24.

It will, of course, be apparent that the particular number, location and/or orientation of the alignment ports 29,30 and 34,35, sets of recessed electrical contacts 31,32, and/or fluid connector ports 36,38 is not critical to the present invention provided only that they are so positioned within the end-effector fingers 22,24 as to not interfere with gripping of any other objects which may not have compatible alignment and/or utility connections. Thus, there may be more or less than two (2) alignment ports per end-effector finger; and, the ports may be symmetrically or asymmetrically located therein relative to a vertical centerline passing through the end-effector fingers provided only that they are positioned so as to generically mate with corresponding alignment pins formed on the various different tools to be employed. Indeed, where the end-effector fingers are not required to grip objects other than specific tools, it is within the scope of the invention to mount the alignment pins on the inwardly presented faces 22',24' of the "fingers" 22,24 and projecting out of the plane thereof for engagement with similarly located alignment ports formed in the opposite faces of the tools. In like fashion, there may be more or fewer than the two (2) illustrative sets of recessed electrical contacts 31,32 shown in FIG. 1, and more or fewer than the illustrative two (2) fluid communication ports 36,38 shown in FIG. 2. Indeed, in some instances, it may be desirable to couple one or more of the fluid supply lines 39,40 to some source of material that is to be dispensed by the tool such, for example, as a solvent or adhesive.

Figure 3:
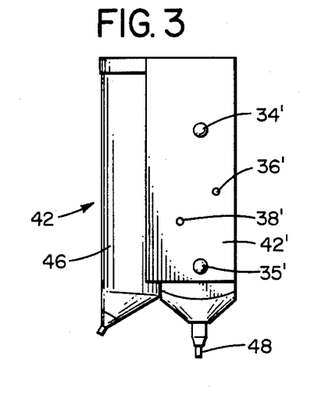
FIG. 3 is a side elevational view of an exemplary tool suitable for applying and adhesively bonding part spacers to workpieces, here illustrating that face of the tool adapted to be engaged by the operative face of the end-effector "finger" shown in FIG. 2.
Figure 4:
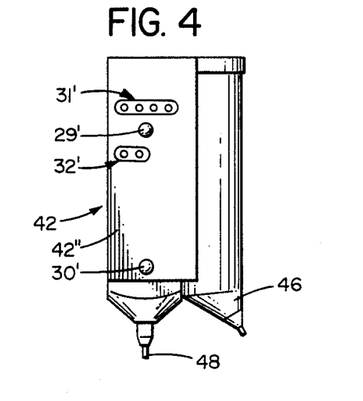
FIG. 4 is a side elevational view of the opposite face of the part spacer applying tool shown in FIG. 3, here depicting that face of the tool adapted to be engaged by the operative face of the end-effector "finger" shown in FIG. 1.
Figure 5:
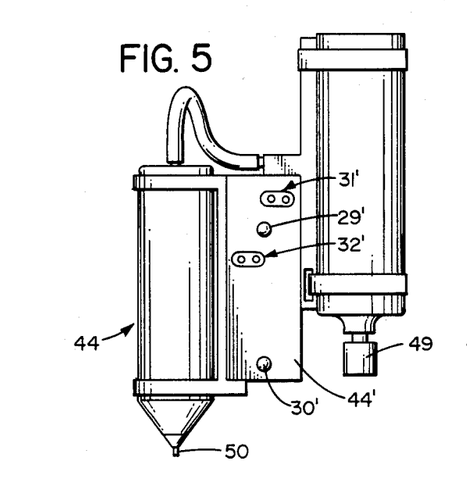
FIG. 5 is a side elevational view of a tool suitable for use in bonding components to circuit boards, here depicting that face of the tool adapted to be engaged by the end-effector "finger" depicted in FIG. 1.
Figure 6:
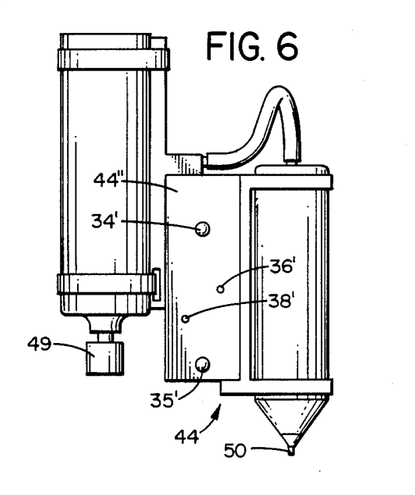
FIG. 6 is a side elevational view of the opposite face of the tool shown in FIG. 5—viz., that face adapted to be engaged by the end-effector "finger" shown in FIG. 2.

Turning next to FIGS. 3 through 8, there have been illustrated the opposite end-effector "finger" engaging faces of three (3) different exemplary robotic tools which are generally conventional in construction and mode of operation but, which have here been modified in accordance with the present invention. Thus, FIGS. 3 and 4 respectively depict the opposite faces 42',42" of a robotic tool 42 suitable for applying and adhesively bonding part spacers to workpieces; FIGS. 5 and 6 respectively depict the opposite faces 44',44" of a robotic tool 44 suitable for use in bonding components to circuit boards or the like; and, FIGS. 7 and 8 respectively depict the opposite faces 45',45" of a robotic tool 45 suitable for removing circuit board connector pins. It will, of course, be understood that the functional and/or structural arrangements for the exemplary tools 42,44,45 form no part of the present invention; and, such tools have here been depicted solely for purposes of emphasizing the virtually universal flexibility of the present tool changing system.

More specifically, tool 42 (FIGS. 3 and 4) is generally of the type including an adhesive distributor 46 and a vacuum operated tool tip 48 adapted to deliver part spacers to a workpiece (not shown) wherein a discrete quantity of adhesive is applied to the workpiece by distributor 46 and the part spacer is accurately positioned on the adhesive material by tool 48 so as to permit bonding of the part spacer to the workpiece. With respect to the tool 44 depicted in FIGS. 5 and 6, such tool includes a first work engaging tip 49 comprising an abrasive wheel or brush for preparing the surface of a circuit board and a second distributor tip 50 for discharging discrete quantities of adhesive to be employed in the circuit board preparation and component bonding operation. Similarly, tool 45 depicted in FIGS. 7 and 8 includes a work engaging tip 51 comprising a rotating tubular element having a nonaxial bore (not shown) adapted to receive a circuit board connector pin and removing such pin from the circuit board connector by fracturing the pin at the junction between the pin and the connector body.

However, in carrying out the present invention, each of the exemplary conventional robotic tools 42,44,45 has been modified so as to render such tool uniquely compatible with the robot end-effector 21 (FIGS. 1 and 2) of the present invention. More specifically, referring to FIG. 3, it will be noted that the finger engaging face 42' of tool 42 which is adapted to be placed in face-to-face relation with the tool engaging face 24' of finger 24 (FIG. 2) when gripped by the end-effector 21, includes a pair of vertically spaced, outwardly projecting alignment pins 34',35' adapted to be received within respective ones of the alignment ports 34,35 in finger 24. When properly aligned, fluid connector ports 36',38' formed in the face 42' of tool 42 are registered with, and in fluid communication with, the fluid connector ports 36,38 respectively formed in finger 24, thus enabling the tool 42 to be directly coupled to suitable fluid utility lines and/or sources (not shown) for permitting proper operation of the tool. For example, one fluid utility line might comprise a vacuum source for applying a vacuum to the tool engaging tip 48 while the other fluid connector port might be used to couple the adhesive dispenser 46 to means for pneumatically dispensing metered discrete quantities of adhesive therefrom. In like fashion, and as best indicated by reference to FIGS. 6 and 8, it will be noted that the finger engaging faces 44" and 45" of tools 44 and 45, respectively, are each provided with similar sets of vertically spaced alignment pins 34',35' and fluid connector ports 36', 38', adapted to be registered with the corresponding alignment ports 34,35 and fluid connector ports 36,38 in the tool engaging face 24' of finger 24 (FIG. 2).

Figure 1:
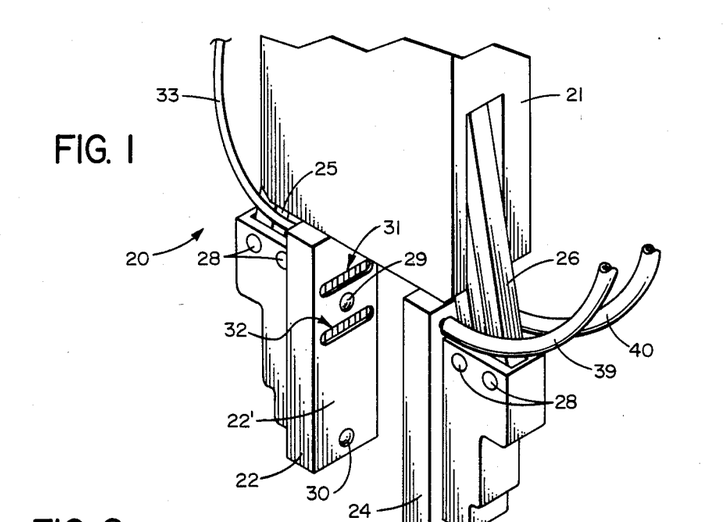
FIG. 1 is a fragmentary perspective view of a robot end-effector or "hand" embodying features of the present invention and suitable for use in interchangeably acquiring, aligning and utilizing one of a wide variety of industrial-type tools which may be electrically powered, fluid powered, or electrical/fluid powered, here illustrating the operative tool engaging face of one of the end-effector "fingers"

Similarly, and as best depicted in FIG. 4, it will be noted that the finger engaging face 42" of tool 42 includes a pair of vertically spaced alignment pins 29',30' projecting out of the plane of the finger engaging face 42" and positioned for reception with the alignment ports 29,30 formed in the tool engaging face 22' of finger 22 (FIG. 1). Similarly, in this case, tool 42 includes a first set 31' of four (4) outwardly projecting electrical connector pins and a second set 32' of two (2) outwardly projecting electrical connector pins adapted to be placed in electrical contact with six (6) respective ones of the recessed electrical contacts formed in the first and second sets 31,32 of contacts in finger 22 (FIG. 1). Thus, when tool 42 is properly aligned by means of reception of the alignment pins 29',30',34',35' within the corresponding alignment openings 29,30,34,35 in fingers 22,24 and the tool is gripped such fingers, the tool identification circuit established by any two (2) of the six (6) mutually engaged electrical pins and contacts serves to identify the electrical and/or fluid utility lines required for operation of that particular unique tool; and, such specifically identified electrical and/or fluid utility lines are rendered operative by the robot controller (not shown) and completed through the now mutually engaged sets of fluid connector ports 36/36' and 38/38' and the remaining four (4) mutually engaged electrical contacts and connector pins in the first and second sets 31/31' and 32/32'.

Figure 7:
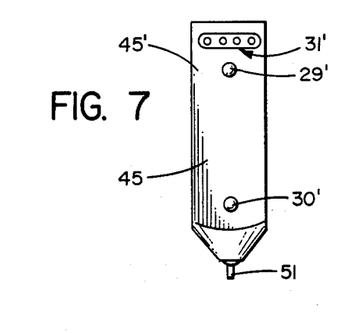
FIG. 7 is a side elevational view of yet another robot manipulable tool suitable for removing circuit board connector pins, and here illustrating that face of the tool adapted to be engaged by the end-effector "finger" shown in FIG. 1.
Figure 8:
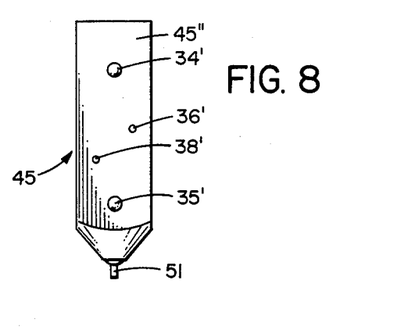
FIG. 8 is a side elevational view of the opposite face of the tool shown in FIG. 7—viz., that face adapted to be engaged by the end-effector "finger" shown in FIG. 2.

Referring to FIGS. 5 and 7, it will be observed that the tools 44 and 45 are similarly provided with outwardly projecting pairs of alignment pins 29',30' and first and/or second sets 31',32' of outwardly projecting electrical connector pins. Thus, the tool 44 depicted in FIG. 5 employs two (2) electrical connector pins in each of the first and second sets of pins 3',32', while the tool 45 depicted in FIG. 7 employs four (4) electrical connector pins arranged in the first set 31' of pins, but no electrical connector pins for engagement with the second set 32 of electrical contacts in finger 22 (FIG. 1). In both FIGS. 5 and 7, two (2) of the four (4) illustrative electrical connector pins are dedicated to the tool identification circuitry described hereinbelow.

Figure 9:
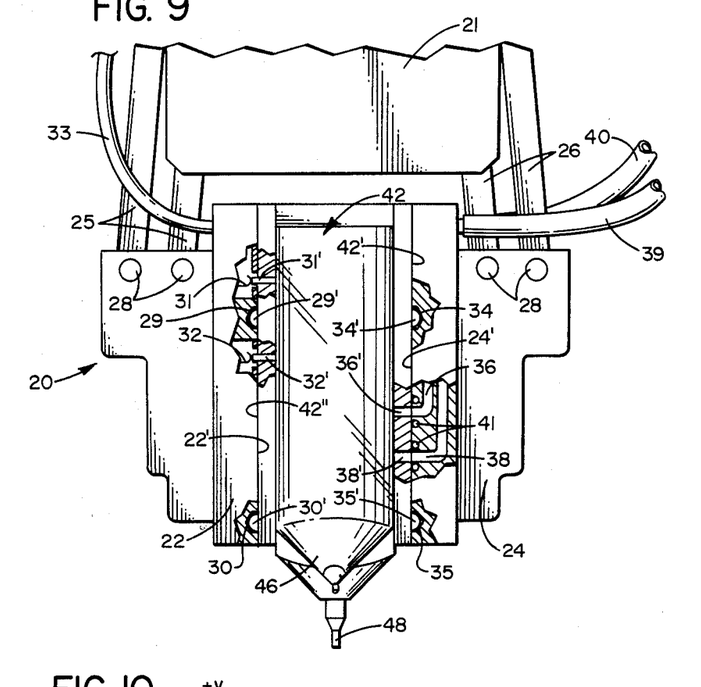
FIG. 9 is a front elevational view, partly in section, depicting the tool of FIGS. 3 and 4 grasped between the two "fingers" of the robot end-effector shown in FIGS. 1 and 2, and illustrating particularly the interengagement of the tool alignment mechanism and fluid and electrical motive power and/or utility line connections; and, FIG. 10 is a circuit diagram here illustrating an exemplary tool comparator circuit which is capable of identifying the particular tool grasped by the robot end-effector "fingers" and rendering operative only those electrical and/or fluid motive power utility lines which are required to properly operate the particular tool grasped and manipulated by the robot end-effector.

Referring next to FIG. 9, the exemplary robot tool manipulator 20 has been depicted in tool engaging and gripping relationship with the exemplary tool 42 depicted in FIGS. 3 and 4. Thus, as here shown, the "fingers" 22,24 on the end-effector 21 have been shifted towards one another so that the tool engaging faces 22',24' thereon engage respective ones of the finger engaging faces 42",42' on the tool 42. In this position, the alignment pins 29',30',34',35', on the tool 42 are received within respective ones of the alignment ports 29,30 in finger 22 and the alignment ports 34,35 in finger 24, thus properly aligning the tool 42 with respect to the end-effector 21 and permitting registration of the aligned fluid connector ports 36/36', 38/38', and the aligned recessed contacts and projecting electrical connector pins in the first and second sets of contacts 31,32 and pins 31',32'. It will, of course, be appreciated that the arrangement is such that if the tool 42 is not properly aligned with respect to the end-effector "fingers" 22,24, then the alignment pins 29',30',34',35' will preclude completion of the electrical circuits defined by the first and second sets of recessed contacts 31,32 and the first and second sets of electrical connector pins 31',32'. In the case of such misalignment, since the electrical connector pins in the first and second sets 31',32' are unable to depress respective ones of the recessed electrical contacts in the first and second sets of contacts 31,32, the tool identification circuit will not be completed; and, therefore, no provision is made for completing the enabling circuitry for rendering the electrical and/or fluid utility lines operative.

Figure 10:
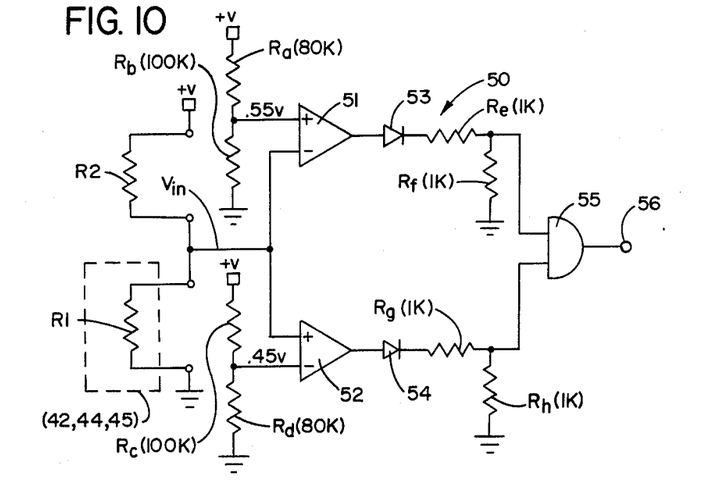

As previously indicated, in carrying out the present invention, provision is made for uniquely identifying each different tool employed so as to render operative only those particular utility control lines which are uniquely required by each different tool. To this end, and as best illustrated in FIG. 10, each of the tools 42,44,45 depicted in FIGS. 3 through 8 includes a resistor R1 embedded therein whose resistance value is selected so as to uniquely identify that particular tool. Thus, the arrangement is such that when a given one of the tools 42,44,45—for example, the tool 42 shown in FIGS. 3 and 4—is properly aligned and gripped by the end-effector "fingers" 22,24 as shown in FIG. 9, that unique resistance value established by the resistor R1 is compared to the resistance value for a reference resistor R2 which may be part of the fixturing for the robotic tool manipulating system or may be incorporated in the robotic controller (not shown). Thus, the resistor R2 may take the form of a fixed value resistor uniquely corresponding to the value of the resistor R1 embedded in the tool, in which case provision must be made for selecting or establishing the appropriate reference resistor value by the tool operator each time a particular tool is first selected; or, alternatively, resistor R2 may be one of a plurality of different valued resistors R2 each associated with its own comparator circuit or, for that matter, a variable resistor whose value can be adjusted either manually by an operator or automatically by the robot controller until the value falls within an acceptable range for matching of R1 and R2.

In any of the foregoing cases, the values of the resistors R1 and R2 are compared in a suitable tool comparator circuit, generally indicated at 50 in FIG. 10. Thus, as here shown, the comparator circuit 50 includes a pair of voltage dividing resistor networks $R_a, R_b$ (which have respective values of 80K and 100K in the exemplary circuitry) and $R_c, R_d$ (having the respective values of 100K and 80K). The arrangement is such that the input voltage at the plus terminal for a first comparator amplifier 51 is 5.5 volts where the supply voltage $+V$ is 10 volts, while the voltage at the negative input terminal for a second comparator amplifier 52 would be 4.5 volts. The voltage in $V_{in}$ resulting from comparison of the values of resistors R1 and R2 is respectively input to the negative and positive input terminals of the comparator amplifiers 51,52. Thus, the comparator circuitry 50 establishes "acceptance limits" for comparison of the resistors R1,R2 which are "LOGICAL TRUE" when R1 equals R2. Under these conditions, the voltage in $V_{in}$ is less than 5.5 volts and more than 4.5 volts; and, consequently, the signal values at the output of the comparator amplifiers 51,52 will both be high. Such output values are passed through diodes 53,54 and suitable 1K tiedown resistor networks $R_e, R_f$ and $R_g, R_h$ to an output AND gate 55. Where both voltage signals input to the AND gate are high, a plus signal is output from the comparator circuitry 50 at terminal 56 which serves to close the appropriate relays in the robotic controller (not shown) for powering the applicable utility lines. Where the system is intended to be operated with multiple tools, output terminal 56 will preferably be switched to enabling circuits for particular sets of relays in the controller (not shown) dependent upon the value of R2 (or $V_{in}$) so as to insure that only those utility lines are enabled which are associated with the particular tool being used. On the other hand, if the voltage in $V_{in}$ is outside of the acceptable limit established by the comparator circuitry 50, the output signal from one of the comparator amplifiers 51,52 will be low, thereby insuring that the applicable relays in the robotic controller are not closed and that the tool will not be enabled.

Thus, those skilled in the art will appreciate that by the simple expedient of embedding resistors R1 within each different tool having values which are uniquely representative of that tool, and then comparing the value of the identification resistor R1 in the particular tool gripped by the end-effector 21 with a reference resistor value R2, the robotic controller may readily distinguish between different tools on an "intelligent" basis; and, thus, enable the particular utility control lines which are associated with that particular tool.

What is claimed is:

1. An end-effector for use with robotic tool manipulators and characterized by its ability to acquire, align, grip, and manipulate any selected one of a plurality of different tools, each having its own unique requirements in terms of utilities and utility control lines necesssary for proper operation thereof, and wherein each different tool incorporates a tool identification device which uniquely identifies that particular tool; said end-effector comprising, in combination:

(a) a pair of opposable, vise-like gripper fingers each having an inwardly presented tool-engaging face, said fingers being mounted on said end-effector with freedom for controlled movement towards and away from one another;

(b) at least one first fluid connector port formed in said tool-engaging face of one of said fingers and positioned thereon for interengagement with any second fluid connector port formed on a finger-engaging face of each of the tools, each said first fluid connecting ports communicating with a fluid line extending through said finger and adapted to be connected to a fluid utility source;

(c) first electrical contact means formed in said tool-engaging face of one of said fingers and positioned thereon for interengagement with any second electrical contact means formed on a finger-engaging face of each of the tools;

(d) at least one electrical control line coupled to said first electrical contact means and extending through said finger and adapted to be coupled to an electrical utility source;

(e) tool identification means associated with said robotic manipulator;

(f) means formed in said tool-engaging face of one of said fingers for sensing the tool identification device incorporated in each different tool when gripped by said fingers, said sensing means adapted to be connected to said tool identification means associated with the robotic tool manipulator for defining and rendering operative only those particular utilities and utility control lines required to operate the particular tool gripped between said fingers;

(g) first alignment means formed in at least one tool engaging face of at least one of said fingers and adapted to interengage with second alignment means formed on a finger engaging face of each tool for properly aligning the tool with respect to said fingers when gripped thereby and for precluding registration of said first fluid connector port(s), said first electrical contact means, and said sensing means with any second fluid connecting port(s), any second electrical contact means and said tool identification device when the tool is improperly aligned with respect to said fingers; and, (h) said first fluid connector port(s), first electrical contact means, sensing means and first aligning means being located on said tool engaging faces of said pair of fingers at fixed generic locations corresponding to preselected generic locations for any required second fluid connector port(s) and/or second electrical contact means, the tool identification device, and the second tool alignment means formed on the finger-engaging faces of each of the tools so that when any given tool is acquired, aligned and gripped between said end-effector fingers and said first and second alignment means are properly interengaged, registration of said tool sensing means and the tool identification device formed in the particular gripped tool results in generation of a signal identifying the particular tool gripped which serves to define and enable the particular utility(ies) and utility control line(s) required for operation of that tool.

2. A robotic tool manipulator characterized by its ability to acquire, align, grip, and manipulate any selected one of a plurality of different tools, each having its own unique requirements in terms of utilities and utility control lines necessary for proper operation thereof and wherein each different tool incorporates a tool identification device which uniquely identifies that particular tool, said robotic tool manipulator comprising, in combination:

(a) a manipulable tool arm;

(b) an end-effector mounted on said arm and having a pair of opposable, vise-like gripping fingers, each having an inwardly presented tool-engaging face, said fingers being mounted on said end-effector with freedom for controlled movement towards and away from one another;

(c) at least one first fluid connector port formed in said tool-engaging face of one of said fingers and positioned thereon for interengagement with any second fluid connector port formed on a finger engaging face of one of the tools, each said first fluid connecting port communicating with a fluid line extending through said finger and adapted to be coupled to a fluid utility source;

(d) first electrical contact means formed in said tool engaging face of one of said fingers adapted to be interengaged with second electrical contact means formed in the finger engaging face of one of the tools;

(e) at least one electrical control line extending from said first electrical contact means through said finger and adapted to be coupled to an electrical utility source;

(f) tool identification means associated with said robotic tool manipulator;

(g) means formed in the tool engaging face of one of said fingers for sensing and identifying the tool identification device incorporated in each different tool while gripped between said fingers, and adapted to be coupled to said tool identification means associated with said robotic tool manipulator for defining and rendering operative only those particular utilities and utility control lines required to operate the particular tool gripped between said fingers;

(h) first alignment means formed in the tool engaging face of at least one of said fingers and adapted to be interengaged with second alignment means formed on a finger engaging face of each tool for properly aligning the tool with respect to said fingers when gripped thereby and for precluding registration of said first fluid connector port(s), said first electrical contact means, and said sensing means with any second fluid connector port(s), any second electrical contact means, and the tool identification device when the gripped tool is improperly aligned with respect to said fingers; and, (i) said first fluid connector port(s), first electrical contact means, sensing means, and first alignment means being located on said tool-engaging faces of said pair of fingers at fixed generic locations corresponding to preselected generic locations for any registerable second fluid connector port(s), any second electrical contact means, the tool identification device, and the second tool alignment means formed on the finger engaging faces of each of the tools so that when any given tool is acquired, aligned and gripped between said end-effector fingers and said first and second alignment means are properly interengaged, registration of said tool sensing means and the tool identification device formed in the particular gripped tool results in generation of a signal routed to said tool identification means which serves to identify the particular tool gripped between said fingers and to define and enable the particular utility(ies) and utility control lines required for operation of that tool.

3. The combination as set forth in claims 1 or 2 wherein said first alignment means on said tool engaging face(s) of said end-effector finger(s) comprises alignment ports formed therein, and said second alignment means on the finger engaging face(s) of the tool gripped by said end-effector comprises alignment pins projecting out of the plane of the finger engaging face on the tool and adapted to be received within said alignment ports.

4. The combination as set forth in claims 1 or 2 wherein "O"-ring type sealing means are formed in the tool engaging face of said end-effector finger in surrounding relation to said first fluid connector port(s) so that when a tool is gripped between said end-effector fingers and said first and second fluid connector ports are in aligned registration, a fluid-tight seal is established at the interface of said finger and the tool.

5. A changeable tool system for a robotic tool manipulator characterized by its ability to successively acquire, grip and manipulate a plurality of different robotic tools and wherein the robotic tool manipulator is of the type having an end-effector with a pair of vise-like gripping fingers each having an inwardly presented tool engaging face so as to permit selection, definition and enabling of only the utility(ies) and utility control line(s) needed to properly operate each tool; said system comprising, in combination:

(a) a tool identifying device mounted in each of said tools which is capable of being sensed and which uniquely identifies that particular tool;

(b) first connector means formed on a robot end-effector finger engaging face of each of said tools which is directly coupled to said tool identifying device;

(c) first alignment means formed on at least one of the robot end-effector finger engaging faces of each of said tools;

(d) first fluid connector ports and/or first electrical contact means formed on a finger engaging face of each of said tools, as required, to effect proper operation of that tool; and, wherein said first connector means, said first alignment means and the required one(s) of said first fluid connector port(s) and/or said first electrical contact means formed on said finger-engaging faces of each of said tools are located at generic positions which are the same for each and every tool to be gripped and manipulated;

(e) second connector means formed on the tool engaging face of at least one of said robotic end-effector gripping fingers and positioned thereon for registration and coupling with said first connector means on the particular tool gripped by said robotic end-effector for conveying a signal from said tool identification device which uniquely identifies the particular tool gripped by said end-effector;

(f) second alignment means formed on the tool engaging face of at least one of said pair of opposable end-effector fingers for interengagement with said first alignment means formed on said finger engaging face(s) of the particular tool gripped by said end-effector for properly aligning said tool therewith;

(g) second fluid connector ports formed on said tool engaging face of an end-effector finger for registration and engagement with any first fluid connector port on the particular tool gripped by said end-effector;

(h) second electrical contact means formed on said tool engaging face of an end-effector finger for registration and interengagement with any first electrical contact means formed on the particular tool gripped by said end-effector; and, (i) control means for utilizing the signal generated and conveyed over said mutually engaged first and second connector means to select, define and enable the particular utility(ies) and utility control lines required for proper operation of the particular tool gripped by said end-effector.

6. The combination as set forth in claim 5 wherein said first alignment means on said tool engaging face(s) of said end-effector finger(s) comprises alignment ports formed therein, and said second alignment means on said finger engaging face(s) of said tool gripped by said end-effector comprises alignment pins projecting out of the plane of said finger engaging face(s) on said tool adapted to be received within respective ones of said alignment ports.

7. The combination as set forth in claims 5 or 6 wherein "O"-ring type sealing means are formed in said tool engaging face of said end-effector finger in surrounding relation to said first fluid connector port(s) so that when a tool is gripped between said end-effector fingers and said first and second fluid connector ports are in aligned registration, a fluid-tight seal is established at the interface of said finger and said tool.

8. The method for successively acquiring, gripping and manipulating a plurality of different robotic tools with a robotic tool manipulator of the type having an end-effector with a pair of vise-like gripping fingers each having an inwardly presented tool engaging face so as to permit selecting, defining and rendering operative only those utilities and utility control lines needed to properly operate each tool; said method comprising the steps of:

(a) mounting a tool identifying device in each tool which is capable of being sensed and which uniquely identifies that particular tool;

(b) providing first connector means on a robot end-effector finger engaging face of each tool which is directly coupled to the tool identifying device;

(c) providing first alignment means on at least one of the robot end-effector finger engaging faces of each tool;

(d) forming first fluid connector ports and/or first electrical contact means on a finger engaging face of each tool, as required, to effect proper operation of that tool; and, wherein the first connector means, first alignment means and the required one(s) of the first fluid connector port(s) and/or first electrical contact means formed on the finger-engaging faces of each tool are located at generic positions which are the same for each and every tool to be gripped and manipulated;

(e) forming second connector means formed on the tool engaging face of a robotic end-effector gripping finger positioned thereon for registration and coupling with the first connector means on the particular tool gripped by the robotic end-effector for conveying a signal from the tool identification device which uniquely identifies the particular tool gripped by the end-effector;

(f) forming second alignment means on the tool engaging face of at least one of the pair of opposable end-effector fingers for interengagement with the first alignment means formed on the finger engaging face(s) of the particular tool gripped by the end-effector for properly aligning the tool therewith;

(g) forming second fluid connector ports on the tool engaging face of an end-effector finger for registration and engagement with any first fluid connector port on the particular tool gripped by the end-effector;

(h) forming second electrical contact means on said tool engaging face of an end-effector finger for registration and interengagement with any first electrical contact means formed on the particular tool gripped by the end-effector; and, (i) utilizing the signal generated and conveyed over the mutually engaged first and second connector means to select, define and enable those particular utility(ies) and utility control lines required for proper operation of the particular tool gripped by said end-effector.

9. An end-effector for use with robotic tool manipulators and characterized by its ability to acquire, align, grip, and manipulate any selected one of a plurality of different tools, each having its own unique requirements in terms of utilities and utility control lines necessary for proper operation thereof, and wherein each different tool incorporates a tool identification device which uniquely identifies that particular tool; said end-effector comprising, in combination:

(a) a pair of opposable, vise-like gripper fingers each having an inwardly presented tool-engaging face, said fingers being mounted on said end-effector with freedom for controlled movement towards and away from one another;

(b) at least one first fluid connector port formed in said tool-engaging face of one of said fingers and positioned thereon for interengagement with any second fluid connector port formed on a finger-engaging face of each of the tools, each said first fluid connecting ports communicating with a fluid line extending through said finger and adapted to be connected to a fluid utility source;

(c) first electrical contact means comprising a plurality of recessed electrical contacts formed in said tool-engaging face of one of said fingers and positioned thereon for interengagement with any second electrical contact means comprising electrical connector pins formed on and projecting out of the plane of a finger-engaging face of each of the tools and wherein said electrical connector pins are adapted to electrically interconnect with specific ones of said recessed electrical contacts;

(d) at least one electrical control line coupled to said first electrical contact means and extending through said finger and adapted to be coupled to an electrical utility source;

(e) tool identification means associated with said robotic tool manipulator;

(f) means formed in said tool-engaging face of one of said fingers for sensing the tool identification device incorporated in each different tool when gripped by said fingers, said sensing means adapted to be connected to said tool identification means associated with the robotic tool manipulator for defining and rendering operative only those particular utilities and utility control lines required to operate the particular tool gripped between said fingers;

(g) first alignment means formed in at least one tool engaging face of at least one of said fingers and adapted to interengage with second alignment means formed on a finger engaging face of each tool for properly aligning the tool with respect to said fingers when gripped thereby and for precluding registration of said first fluid connector port(s), said first electrical contact means, and said sensing means with any second fluid connecting port(s), any second electrical contact means and said tool identification device when the tool is improperly aligned with respect to said fingers; and, (h) said first fluid connector port(s), first electrical contact means, sensing means and first aligning means being located on said tool engaging faces of said pair of fingers at fixed generic locations corresponding to preselected generic locations for any required second fluid connector port(s) and/or second electrical contact means, the tool identification device, and the second tool alignment means formed on the finger-engaging faces of each of the tools so that when any given tool is acquired, aligned and gripped between said end-effector fingers and said first and second alignment means are properly interengaged, registration of said tool sensing means and tool identification device formed in the particular gripped tool results in generation of a signal identifying the particular tool gripped which serves to define and enable the particular utility(ies) and utility control line(s) required for operation of that tool.

10. A robotic tool manipulator characterized by its ability to acquire, align, grip, and manipulate any selected one of a plurality of different tools, each having its own unique requirements in terms of utilities and utility control lines necessary for proper operation thereof and wherein each different tool incorporates a tool identification device which uniquely identifies that particular tool, said robotic tool manipulator comprising, in combination:
  (a) a manipulable tool arm;
  (b) an end-effector mounted on said arm and having a pair of opposable, vise-like gripping fingers, each having an inwardly presented tool-engaging face, said fingers being mounted on said end-effector with freedom for controlled movement towards and away from one another;
  (c) at least one first fluid connector port formed in said tool-engaging face of one of said fingers and positioned theron for interengagement with any second fluid connector port formed on a finger engaging face of one of the tools, each said first fluid connecting port communicating with a fluid line extending through said finger and adapted to be coupled to a fluid utility source;
  (d) first electrical contact means comprising a plurality of recessed electrical contacts formed in said tool engaging face of one of said fingers adapted to be interengaged with second electrical contact means comprising electrical contact pins formed in and projecting out of the plane of the finger engaging face of one of the tools and wherein said electrical connector pins are adapted to electrically interconnect with specific ones of said recessed electrical contacts;
  (e) at least one electrical control line extending from said first electrical contact means through said finger and adapted to be coupled to an electrical utility source;
  (f) tool identification means associated with said robotic tool manipulator;
  (g) means formed in the tool engaging face of one of said fingers for sensing and identifiying the tool identification device incorporated in each different tool while gripped between said fingers, and adapted to be coupled to said tool identification means associated with said robotic tool manipulator for defining and rendering operative only those particular utilities and utility control lines required to operate the particular tool gripped between said fingers;
  (h) first alignment means formed in the tool engaging face of at least one of said fingers and adapted to be interengaged with second alignment means formed on a finger engaging face of each tool for properly aligning the tool with respect to said fingers when gripped thereby and for precluding registration of said first fluid connector port(s), said first electrical contact means, and said sensing means with any second fluid connector port(s), any second electrical contact means, and the tool identification device when the gripped tool is improperly aligned with respect to said fingers; and,
  (i) said first fluid connector port(s), first electrical contact means, sensing means, and first alignment means being located on said tool-engaging faces of said pair of fingers at fixed generic locations corresponding to preselected generic locations for any registerable second fluid connector port(s), any second elctrical contact means, the tool identification device, and the second tool alignment means formed on the finger engaging faces of each of the tools so that when any given tool is acquired, aligned and gripped between said end-effector fingers and said first and second alignment means are properly interengaged, registration of said tool sensing means and the tool identification device formed in the particular gripped tool results in generation of a signal routed to said tool identification means which serves to identify the particular tool gripped between said fingers and to define and enable the particular utility(ies) and utility control lines required for operation of that tool.

11. An end-effector for use with robotic tool manipulators and characterized by its ability to acquire, align, grip, and manipulate any selected one of a plurality of different tools, each having its own unique requirements in terms of utilities and utility control lines necessary for proper operation thereof, and wherein each different tool incorporates a tool identification device comprising a resistor whose value is selected to provide an identification of that tool which is unique to that particular tool; said end-effector comprising, in combination:
  (a) a pair of opposable, vise-like gripper fingers each having an inwardly presented tool-engaging face, said fingers being mounted on said end-effector with freedom for controlled movement towards and away from one another;
  (b) at least one first fluid connector port formed in said tool-engaging face of one of said fingers and positioned thereon for interengagement with any second fluid connector port formed on a finger-engaging face of each of the tools, each said first fluid connecting ports communicating with a fluid line extending through said finger and adapted to be connected to a fluid utility source;
  (c) first electrical contact means formed in said tool-engaging face of one of said fingers and positioned thereon for interengagement with any second electrical contact means formed on a finger-engaging face of each of the tools;
  (d) at least one electrical control line coupled to said first electrical contact means and extending through said finger and adapted to be coupled to an electrical utility source;
  (e) tool identification means associated with said robotic tool manipulator;
  (f) means formed in said tool-engaging face of one of said fingers for sensing the tool identification device incorporated in each different tool when gripped by said fingers, said sensing means adapted to be connected to said tool identification means associated with the robotic tool manipulator and including reference resistor means for defining and rendering operative only those particular utilities and utility control lines required to operate the particular tool gripped between said fingers;
  (g) first alignment means formed in at least one tool engaging face of at least one of said fingers and adapted to interengage with second alignment means formed on a finger engaging face of each tool for properly aligning the tool with respect to said fingers when gripped thereby and for precluding registration of said first fluid connector port(s), said first electrical contact means, and said sensing means with any second fluid connecting port(s), any second electrical contact means and said tool identification device when the tool is improperly aligned with respect to said fingers; and,
  (h) said first fluid connector port(s), first electrical contact means, sensing means and first aligning means being located on said tool engaging faces of said pair of fingers at fixed generic locations corresponding to preselected generic locations for any required second fluid connector port(s) and/or second electrical contact means, the tool identification device, and the second tool alignment means formed on the finger-engaging faces of each of the tools so that when any given tool is acquired, aligned and gripped between said end-effector fingers and said first and second alignment means are properly interengaged, registration of said tool sensing means and the tool identification device formed in the particular gripped tool results in comparison of the resistance value of said resistor in said tool identification device with said reference resistor means to identify the particular tool gripped by said end-effector, and said tool identification means serves to generate an output signal capable of defining and enabling the particular utility(ies) and utility control line(s) required to properly operate the particular tool gripped by said end-effector.

12. A robotic tool manipulator characterized by its ability to acquire, align, grip, and manipulate any selected one of a plurality of different tools, each having its own unique requirements in terms of utilities and utility control lines necessary for proper operation thereof and wherein each different tool incorporates a tool identification device comprising a resistor whose value is selected to provide an identification of that tool which is unique to that particular tool, said robotic tool manipulator comprising, in combination:

(a) a manipulable tool arm;

(b) an end-effector mounted on said arm and having a pair of opposable, vise-like gripping fingers, each having an inwardly presented tool-engaging face, said fingers being mounted on said end-effector with freedom for controlled movement towards and away from one another;

(c) at least one first fluid connector port formed in said tool-engaging face of one of said fingers and positioned thereon for interengagement with any second fluid connector port formed on a finger engaging face of one of the tools, each said first fluid connecting port communicating with a fluid line extending through said finger and adapted to be coupled to a fluid utility source;

(d) first electrical contact means formed in said tool engaging face of one of said fingers adapted to be interengaged with second electrical contact means formed in the finger engaging face of one of the tools;

(e) at least one electrical control line extending from said first electrical contact means through said finger and adapted to be coupled to an electrical utility source;

(f) tool identification means associated with said robotic tool manipulator, said tool identification means including reference resistor means;

(g) means formed in the tool engaging face of one of said fingers for sensing and identifying the tool identification device incorporated in each different tool while gripped between said fingers, and adapted to be coupled to said tool identification means associated with said robotic tool manipulator for defining and rendering operative only those particular utilities and utility control lines required to operate the particular tool gripped between said fingers;

(h) first alignment means formed in the tool engaging face of at least one of said fingers and adapted to be interengaged with second alignment means formed on a finger engaging face of each tool for properly aligning the tool with respect to said fingers when gripped thereby and for precluding registration of said first fluid connector port(s), said first electrical contact means, and said sensing means with any second fluid connector port(s), any second electrical contact means, and the tool identification device when the gripped tool is improperly aligned with respect to said fingers; and, (i) said first fluid connector port(s), first electrical contact means, sensing means, and first alignment means being located on said tool-engaging faces of said pair of fingers at fixed generic locations corresponding to preselected generic locations for any registerable second fluid connector port(s), any second electrical contact means, the tool identification device, and the second tool alignment means formed on the finger engaging faces of each of the tools so that when any given tool is acquired, aligned and gripped between said end-effector fingers and said first and second alignment means are properly interengaged, registration of said tool sensing means and the tool identification device formed in the particular gripped tool results in comparison of the resistance value of said resistor in said tool identification device with said reference resistor means to identify the particular tool gripped by said end-effector, and said tool identification means serves to generate an output signal capable of defining and enabling the particular utility(ies) and utility control lines required to properly operate the particular tool gripped by said end-effector.

13. A changeable tool system for a robotic tool manipulator characterized by its ability to successively acquire, grip and manipulate a plurality of different robotic tools and wherein the robotic tool manipulator is of the type having an end-effector with a pair of vise-like gripping fingers each having an inwardly presented tool engaging face so as to permit selection, definition and enabling of only the utility(ies) and utility control line(s) needed to properly operate each tool; said system comprising, in combination:

(a) a tool identifying device mounted in each of said tools which is capable of being sensed and which uniquely identifies that particular tool;

(b) first connector means formed on a robot end-effector finger engaging face of each of said tools which is directly coupled to said tool identifying device;

(c) first alignment means formed on at least one of the robot end-effector finger engaging faces of each of said tools;

(d) first fluid connector ports and/or first electrical contact means comprising a plurality of electical connector pins formed on and projecting out of the plane of a finger engaging face of each of said tools, as required, to effect proper operation of that tool; and, wherein said first connector means, said first alignment means and the required one(s) of said first fluid connector port(s) and/or said first electrical contact means formed on said finger-engaging faces of each of said tools are located at generic positions which are the same for each and every tool to be gripped and manipulated;

(e) second connector means formed on the tool engaging face of at least one of said robotic end-effector gripping fingers and positioned thereon for registration and coupling with said first connector means on the particular tool gripped by said robotic end-effector for conveying a signal from said tool identification device which uniquely identifies the particular tool gripped by said end-effector;

(f) second alignment means formed on the tool engaging face of at least one of said pair of opposable end-effector fingers for interengagement with said first alignment means formed on said finger engaging face(s) of the particular tool gripped by said end-effector for properly aligning said tool therewith;

(g) second fluid connector ports formed on said tool engaging face of an end-effector finger for registration and engagement with any first fluid connector port on the particular tool gripped by said end-effector;

(h) second electrical contact means comprising a plurality of recessed electrical contacts formed on said tool engaging face of an end-effector finger for registration and interengagement with specific ones of said plurality of electrical connector pins of said first electrical contact means formed on the particular tool gripped by said end-effector; and, (i) control means for utilizing the signal generated and conveyed over said mutually engaged first and second connector means to select, define and enable the particular utility(ies) and utility control lines required for proper operation of the particular tool gripped by said end-effector.

14. A changeable tool system for a robotic tool manipulator characterized by its ability to successively acquire, grip and manipulate a plurality of different robotic tools and wherein the robotic tool manipulator is of the type having an end-effector with a pair of vise-like gripping fingers each having an inwardly presented tool engaging face so as to permit selection, definition and enabling of only the utility(ies) and utility control line(s) needed to properly operate each tool; said system comprising, in combination:

(a) a tool identifying device comprising a resistor mounted in each of said tools whose value is selected to provide an identification of that tool which is unique to that tool;

(b) tool identification means associated with the robotic tool manipulator and including reference resistor means;

(c) first connector means formed on a robot end-effector finger engaging face of each of said tools which is directly coupled to said tool identifying device;

(d) first alignment means formed on at least one of the robot end-effector finger engaging faces of each of said tools;

(e) first fluid connector ports and/or first electrical contact means formed on a finger engaging face of each of said tools, as required, to effect proper operation of that tool; and, wherein said first connector means, said first alignment means and the required one(s) of said first fluid connector port(s) and or said first electrical contact means formed on said finger-engaging faces of each of said tools are located at generic positions which are the same for each and every tool to be gripped and manipulated;

(f) second connector means formed on the tool engaging face of at least one of said robotic end-effector gripping fingers and positioned thereon for registration and coupling with said first connector means on the particular tool gripped by said robotic end-effector for conveying a signal from said tool identification device which uniquely identifies the particular tool gripped by said end-effector to said tool identification means;

(g) second alignment means formed on the tool engaging face of at least one of said pair of opposable end-effector fingers for interengagement with said first alignment means formed on said finger engaging face(s) of the particular tool gripped by said end-effector for properly aligning said tool therewith;

(h) second fluid connector ports formed on said tool engaging face of an end-effector finger for registration and engagement with any first fluid connector port on the particular tool gripped by said end-effector;

(i) second electrical contact means formed on said tool engaging face of an end-effector finger for registration and interengagement with any first electrical contact means formed on the particular tool gripped by said end-effector; and, (j) control means for comparing the resistance value of said resistor in said tool identification device with the resistance value(s) of said reference resistor means to identify the particular tool gripped by said end-effector, and wherein said tool identification means serves to generate an output signal capable of defining and enabling the particular utility-(ies) and utility control lines required for proper operation of the particular tool gripped by said end-effector.

15. A changeable tool system for a robotic tool manipulator characterized by its ability to successively acquire, grip and manipulate plurality of different robotic tools and wherein the robotic tool manipulator is of the type having an end-effector with a pair of vise-like gripping fingers each having an inwardly presented tool engaging face so as to permit selection, definition and enabling of only the utility(ies) and utility control line(s) needed to properly operate each tool; said system comprising, in combination:

(a ) a tool identifying device comprising a resistor mounted in each of said tools whose value is selected to provide an identification of that tool which is unique to that tool;

(b) tool identification means associated with the robotic tool manipulator and including reference resistor means;

(c) first connector means formed on a robot end-effector finger engaging face of each of said tools which is directly coupled to said tool identifying device;

(d) first alignment means comprising alignment pins formed on and projecting out of the plane of at least one of the robot end-effector finger engaging faces of each of said tools;

(e) first fluid connector ports and/or first electrical contact means formed on a finger engaging face of each of said tools, as required, to effect proper operation of that tool; and, wherein said first connector means, said first alignment means and the required one(s) of said first fluid connector port(s) and/or said first electrical contact means formed on said finger-engaging faces of each of said tools are located at generic positions which are the same for each and every tool to be gripped and manipulated;

(f) second connector means formed on the tool engaging face of at least one of said robotic end-effector gripping fingers and positioned thereon for registration and coupling with said first connector means on the particular tool gripped by said robotic end-effector for conveying a signal from said tool identification device which uniquely identifies the particular tool gripped by said end-effector to said tool identification means;

(g) second alignment means comprising alignment ports formed on the tool engaging face of at least one of said pair of opposable end-effector fingers for interengagement with said first alignment means and reception of said alignment pins formed on said finger engaging face(s) of the particular tool gripped by said end-effector for properly aligning said tool therewith;

(h) second fluid connector ports formed on said tool engaging face of an end-effector finger for registration and engagement with any first fluud connector port on the particular tool gripped by said end-effector;

(i) second electrical contact means formed on said tool engaging face of an end-effector finger for registration and interengagement with any first electrical contact means formed on the particular tool gripped by said end-effector; and, (j) control means for comparing the resistance value of said resistor in said tool identification device with the resistance value(s) of said reference resistor means to identify the particular tool gripped by said end-effector, and wherein said tool identification means serves to generate an output signal capable of defining and enabling the particular utility(ies) and utility control lines required for proper operation of the particular tool gripped by said end-effector.

16. A changeable tool system for a robotic tool manipulator characterized by its ability to successively acquire, grip and manipulate a plurality of different robotic tools and wherein the robotic tool manipulator is of the type having an end-effector with a pair of vise-like gripping fingers each having an inwardly presented tool engaging face so as to permit selection, definition and enabling of only the utility(ies) and utility control line(s) needed to properly operate each tool; said system comprising, in combination:

(a) a tool identifying device comprising a resistor mounted in each of said tools whose value is selected to provide an identification of that tool which is unique to that tool;

(b) tool identification means associated with the robotic tool manipulator and including reference resistor means;

(c) first connector means formed on a robot end-effector finger engaging face of each of said tools which is directly coupled to said tool identifying device;

(d) first alignemt means formed on at least one of the robot end-effector finger engaging faces of each of said tools;

(e) first fluid connector ports and/or first electrical contact means comprising a plurality of electrical connector pins formed on and projecting out of the plane of a finger engaging face of each of said tools, as required, to effect proper operation of that tool;

and, wherein said first connector means, said first alignment means and the required one(s) of said first fluid connector port(s) and/or said first electrical contact means formed on said finger-engaging faces of each of said tools are located at generic positions which are the same for each and every tool to be gripped and manipulated;

(f) second connector means formed on the tool engaging face of at least one of said robotic end-effector gripping fingers and positioned thereon for registration and coupling with said first connector means on the particular tool gripped by said robotic end-effector for conveying a signal from said tool identification device which uniquely identifies the particular tool gripped by said end-effector to said tool identification means;

(g) second alignment means formed on the tool engaging face of at least one of said pair of opposable end-effector fingers for interengagement with said first alignment means formed on said finger engaging face(s) of the particular tool gripped by said end-effector for properly aligning said tool therewith;

(h) second fluid connector ports formed on said tool engaging face of an end-effector finger for registration and engagement with any first fluid connector port on the particular tool gripped by said end-effector;

(i) second electrical contact means comprising a plurality of recessed electrical contacts formed on said tool engaging face of an end-effector finger for registration and interengagement with specific ones of said plurality of electrical connector pins of said first electrical contact means formed on the particular tool gripped by said end-effector; and, (j) control means for comparing the resistance value of said resistor in said tool identification device with the resistance value(s) of said reference resistor mean to identify the particular tool gripped by said end-effector, and wherein said tool identification means serves to generate an output signal capable of defining and enabling the particular utility(ies) and utility control lines required for proper operation of the particular tool gripped by said end-effector.

17. The method for successively acquiring, gripping and manipulating a plurality of different robotic tools with a robotic tool manipulator of the type having an end-effector with a pair of vise-like gripping fingers each having an inwardly presented tool engaging face so as to permit selecting, defining and rendering operative only those utilities and utility control lines needed to properly operate each tool; said method comprising the steps of:

(a) mounting a tool identifying device in each tool, and wherein the device comprises a resistor whose resistance value is selected to be uniquely representative of the particular tool within which the resistor is mounted;

(b) providing first connector means on a robot end-effector finger engaging face of each tool which is directly coupled to the tool identifying device;

(c) providing first alignment means on at least one of the robot end-effector finger engaging faces of each tool;

(d) forming first fluid connector ports and/or first electrical contact means on a finger engaging face of each tool, as required, to effect proper operation of that tool; and, wherein the first connector means, first alignment means and the required one(s) of the first fluid connector port(s) and/or first electrical contact means formed on the finger-engaging faces of each tool are located at generic positions which are the same for each and every tool to be gripped and manipulated;

(e) forming second connector means formed on the tool engaging face of a robotic end-effector gripping finger positioned thereon for registration and coupling with the first connector means on the particular tool gripped by the robotic end-effector for conveying a signal representative of the resistance value of the tool identification device from the tool identification device which uniquely identifies the particular tool gripped by the end-effector;

(f) forming second alignment means on the tool engaging face of at least one of the pair of opposable end-effector fingers for interengagement with the first alignment means formed on the finger engaging face(s) of the particular tool gripped by the end-effector for properly aligning the tool therewith;

(g) forming second fluid connector ports on the tool engaging face of an end-effector finger for registration and engagement with any first fluid connector port on the particular tool gripped by the end-effector;

(h) forming second electrical contact means on said tool engaging face of an end-effector finger for registration and interengagement with any first electrical contact means formed on the particular tool gripped by the end-effector; and, (i) comparing the signal representative of the resistance value of the resistor in the tool identification device and which is conveyed over the mutually engaged first and second connector means with one or more reference resistor values so as to generate a control signal capable of selecting, defining and enabling those particular utility(ies) and utility control lines required for proper operation of the particular tool gripped by the end-effector.

* * * * *